(12) United States Patent
Sanada

(10) Patent No.: US 7,648,144 B2
(45) Date of Patent: Jan. 19, 2010

(54) SEALING DEVICE

(75) Inventor: Masamitsu Sanada, Tokyo (JP)

(73) Assignee: Eagle Industry Co., Ltd., Tokyo (JP)

( * ) Notice: Subject to any disclaimer, the term of this patent is extended or adjusted under 35 U.S.C. 154(b) by 453 days.

(21) Appl. No.: 11/629,307

(22) PCT Filed: Jun. 17, 2005

(86) PCT No.: PCT/JP2005/011572

§ 371 (c)(1),
(2), (4) Date: Dec. 13, 2006

(87) PCT Pub. No.: WO2006/001353

PCT Pub. Date: Jan. 5, 2006

(65) Prior Publication Data

US 2008/0272551 A1  Nov. 6, 2008

(30) Foreign Application Priority Data

Jun. 25, 2004 (JP) ............................... 2004-187980

(51) Int. Cl.
*F16J 15/02* (2006.01)

(52) U.S. Cl. .................. 277/551; 277/564; 277/584

(58) Field of Classification Search .......... 277/551, 277/564, 569, 584
See application file for complete search history.

(56) References Cited

U.S. PATENT DOCUMENTS

| 3,455,564 | A | * | 7/1969 | Dega | 277/559 |
| 2002/0003337 | A1 | * | 1/2002 | Yamada et al. | 277/559 |
| 2003/0075872 | A1 | * | 4/2003 | Ikeda | 277/560 |

FOREIGN PATENT DOCUMENTS

| JP | 5-64572 | 8/1993 |
| JP | 9-133219 | 5/1997 |
| JP | 10-325470 | 12/1998 |
| JP | 2002-54750 | 2/2002 |
| JP | 2003-120821 | 4/2003 |

* cited by examiner

*Primary Examiner*—Vishal Patel
(74) *Attorney, Agent, or Firm*—Wenderoth, Lind & Ponack, L.L.P.

(57) ABSTRACT

In a sealing device of the present invention, a support ring is fitted in an annular recessed part formed on the inner peripheral surface of a seal lip part independently of a reinforcement ring to support the seal lip part from the inner peripheral side, and the support ring is supported axially by a reinforcement ring via an interposed part. Thereby, when a rotating shaft is inserted into the seal ring, a contact area between a seal part and the rotating shaft can be made appropriate, and when a high pressure is applied to the seal lip part, an increase in contact area between the seal part and the rotating shaft can be suppressed within an appropriate range and the seal part becomes able to follow the eccentricity of the rotating shaft.

1 Claim, 7 Drawing Sheets

SEALING DEVICE

TECHNICAL FIELD

The present invention relates to a sealing device which seals the space between a shaft and a housing of equipment.

BACKGROUND ART

Sealing devices which seal the space between a housing and a rotating shaft projecting to the outside from the housing, include known lip type sealing devices (for example, refer to Japanese Unexamined Patent Publication No. 2003-120821). The lip type sealing device is required to have pressure tightness for reliably, preventing leakage of a high-pressure sealed fluid and resistance to wearing and heating caused by sliding friction of the seal lip in contact with the rotating shaft.

On the other hand, in a lip type seal, one having a support ring for supporting a seal lip to maintain an appropriate contact area between a seal lip and a rotating shaft even in a high-pressure environment is known (for example, refer to Japanese Unexamined Patent Publication No. H10-325470).

The lip type sealing device disclosed in Japanese Unexamined Patent Publication No. H10-325470 is an oil seal, including, as shown in FIG. 1, a seal ring 100 made of rubber, having a fitted part 101 which is fitted into a hole 107a of a housing 107, an annular part 102 extending from the fitted part 101 inwardly in the radial direction, a cylindrical seal lip part 103 which extends to the oil side to be sealed on the right of the drawing from the annular part 102 and comes into contact with the rotating shaft 106, a metal-made reinforcement ring 104 embedded in the fitted part 101 and the annular part 102, and a metal-made support ring 105 embedded in an inner peripheral surface in the base region of the seal lip part 103.

The support ring 105 prevents the base region of the seal lip part 103 from deforming excessively toward the rotating shaft 106 side by receiving a pressure, and suppresses wearing and frictional heating due to an increase in the contact area between the seal lip part 103 and the rotating shaft 106.

The reinforcement ring 104 reinforces the fitted part 101 and the annular part 102 of the seal ring 100, and is in contact with the support ring 105 in the axial direction.

The above-described conventional oil seal is formed by integrally molding of the rubber seal ring 100 with the metal-made reinforcement ring 104 and the support ring 105 when forming the rubber seal ring 100.

However, if integrally molding the seal ring 100 with the reinforcement ring 104 and the support ring 105, the contact state between the seal lip part 103 and the rotating shaft 106 when the seal ring 100 is attached to the rotating shaft 106 varies according to variation in molding accuracy of the seal lip part 103. For example, when the seal lip part 103 excessively comes into contact with the rotating shaft 106, the seal lip part 103 deforms from the base region thereof and comes off from the support ring 105, and a gap may be formed between these. If a gap is formed between the support ring 105 and the seal lip part 103, the support ring 105 does not perform the role of supporting the base region of the seal lip part 103.

The seal lip part 103 of the conventional oil seal is provided with a support ring 105, so that it cannot follow the eccentricity of the rotating shaft 106, and wearing greatly progresses under the action of a high pressure.

SUMMARY OF THE INVENTION

The present invention has been made in view of the circumstances of the conventional technique, and it is an object of the present invention to provide a sealing device having a seal lip part to be used for sealing a high-pressure sealed fluid, and more specifically, to provide a sealing device having a seal lip part which can follow the eccentricity of a rotating shaft and has excellent pressure resistance and durability.

A sealing device of the present invention which achieves the object is a sealing device for sealing the space between a housing that houses a sealed fluid inside and a shaft, including a seal ring that is made of a rubber-like elastic material and that has a fitted part to be fitted into a hole of the housing, an annular part extending radially inward from the fitted part, a cylindrical seal lip part extending from the annular part to the sealed fluid side, an annular recessed part provided from the annular part toward the tip end in the inner periphery of the seal lip part and a seal part, a reinforcement ring having an annular reinforcement part embedded in the annular part, and a support ring that is fitted in the annular recessed part of the seal lip part and supports the seal lip part. The annular reinforcement part of the reinforcement ring supports the support ring axially via an interposed part of the rubber-like elastic material forming the seal lip part.

According to this construction, the seal lip part is subjected to the pressure of the sealed fluid, thereby tending to deform to get nearer to the shaft. However, the seal lip part is supported by the support ring from the inner periphery side, so that excessive deformation is prevented, and an increase in contact area between the seal lip part and the shaft is prevented.

By interposing an interposed part of the rubber-like elastic material forming the seal ring between the reinforcement ring and the support ring, the interposed part of the rubber-like elastic material deforms according to the eccentricity of the shaft, so that the seal lip part can follow the eccentricity of the shaft.

Furthermore, the seal ring is molded separately from the support ring, the seal ring is fitted into the annular recessed part formed in the inner peripheral surface of the seal ring, so that the position of the seal lip part can be regulated by the support ring, and even when the seal lip part has a molding error, an excessive increase in contact area between the seal lip part and the shaft can be prevented. In addition, only the support ring can be replaced, and according to the situation, a support ring with different specifications such as material, strength, and dimensions can be applied.

In the above-described construction, the support ring may be fitted into the annular recessed part of the seal lip part so as to press and expand the inner diameter of the seal ring.

According to this construction, when the support ring is fitted into the annular recessed part of the inner peripheral surface of the seal lip part, the support ring supports the seal lip part against a force of elastic deformation of the seal lip part. Thereby, even when the seal lip part deforms, creation of a gap between the support ring and the annular recessed part can be prevented, the seal lip part can be stably supported by the support ring, and the contact state between the seal lip part and the shaft can be stabilized.

In the above-described construction, the supporting surface of the support ring supporting the inner peripheral surface of the seal lip part may be a curved surface whose outer diameter is gradually reduced toward the tip end side of the seal lip part, and the inner peripheral surface of the seal lip part may be curved along the supporting surface of the support ring.

According to this construction, by forming both of the inner peripheral surface of the seal lip part and the supporting surface of the support ring into curved surfaces, stress concentration on the seal lip part can be prevented, and durability of the seal lip part can be increased.

As described above, according to the sealing device of the present invention, by supporting the seal lip part by the support ring designed optimally and interposing a part (interposed part) of the rubber-like elastic material forming the seal lip part between the support ring and the reinforcement ring that supports the support ring, excessive deformation of the seal lip part in a high-pressure environment of the seal lip part can be prevented, and the seal lip part can be made to follow the eccentricity of the shaft. As a result, wearing and heating due to sliding with the shaft can be suppressed, and excellent pressure resistance and durability are obtained.

According to the sealing device of the present invention, the reinforcement ring and the support ring are separated from each other and the support ring is fitted into the seal ring, so that the position of the seal lip part with respect to the shaft can be stabilized, the support ring can be stably joined to the seal ring, and the reliability of the seal can be increased.

DETAILED DESCRIPTION OF THE INVENTION

Hereinafter, most preferred embodiments of the present invention will be described with reference to the accompanying drawings. Herein, a case where the sealing device of the present invention is used for a compressor of an air conditioning system to be installed in an automobile or the like will be described.

Figure 1:
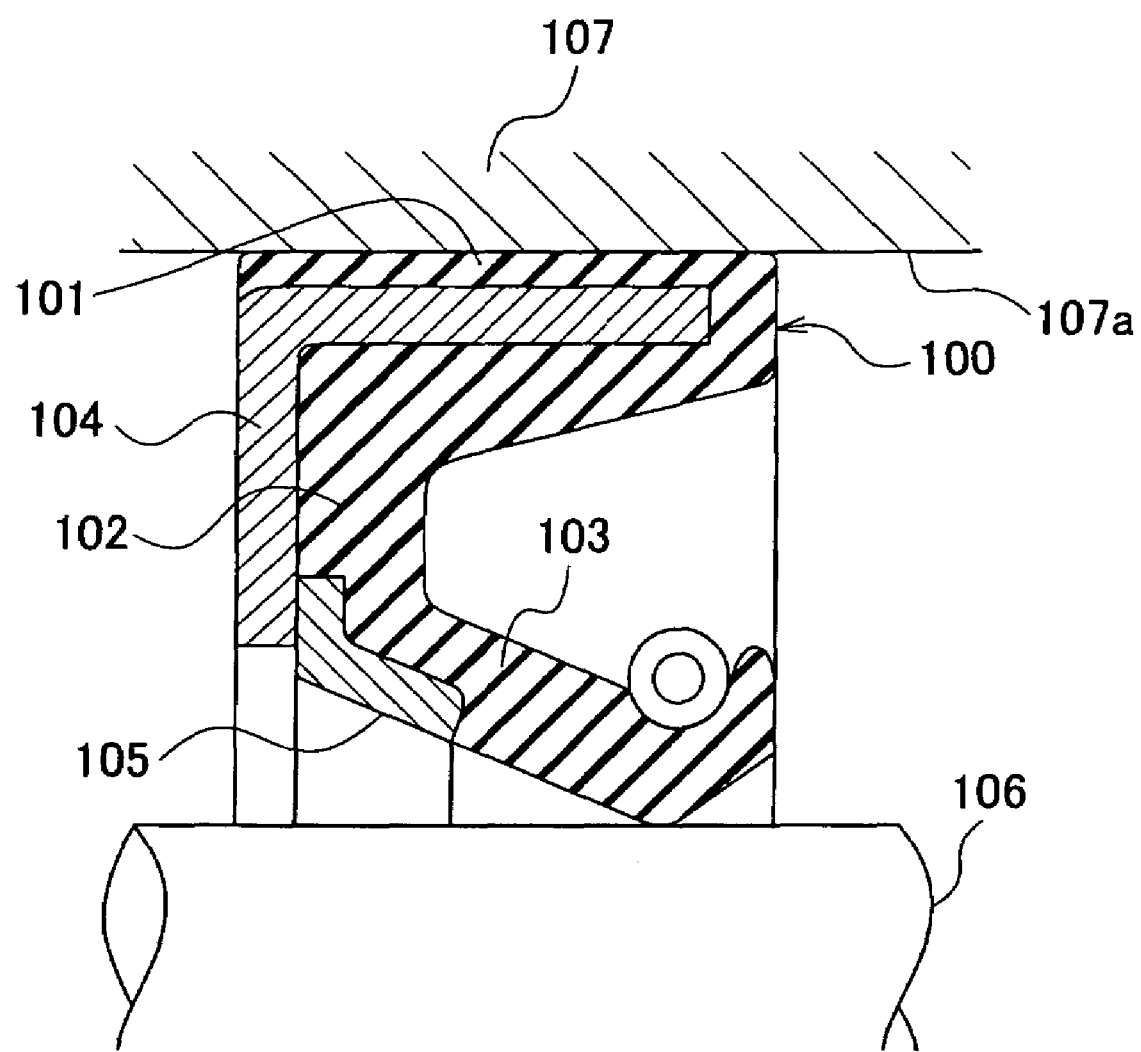
FIG. 1 is a sectional view showing an example of a structure of a conventional sealing device.
Figure 2:
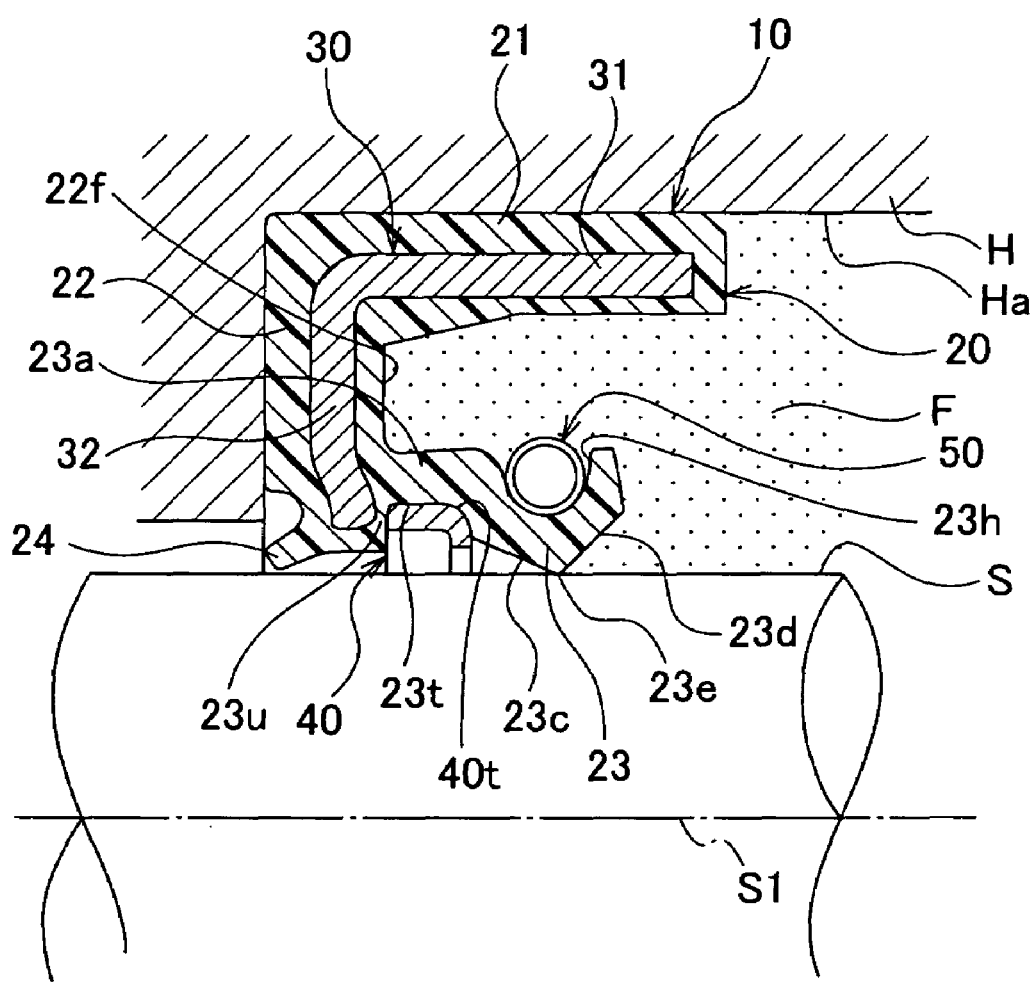
FIG. 2 is a partial sectional view showing a state in that a sealing device according to the invention is attached between a housing and a rotating shaft of a compressor.
Figure 3A:
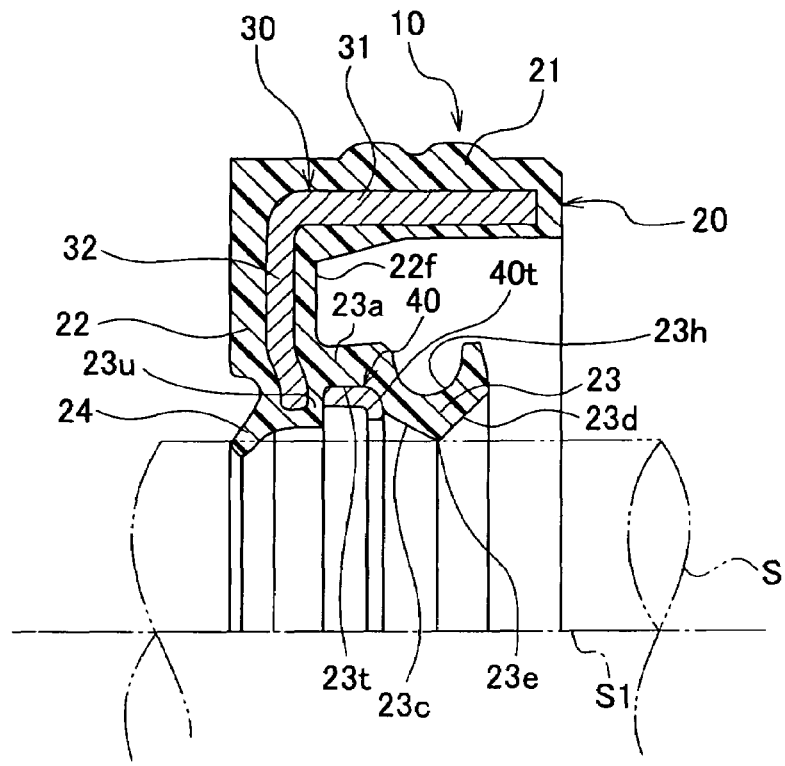
FIG. 3A is a sectional view showing an unattached state of the sealing device according to the invention.
Figure 3B:
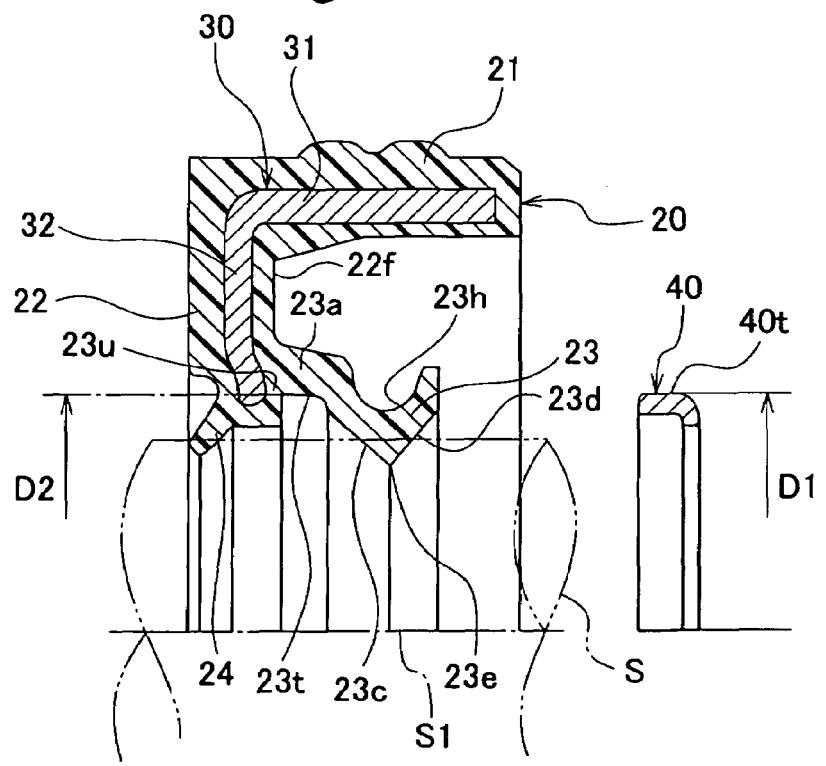
FIG. 3B is a sectional view showing the sealing device before a support ring is attached to the seal ring.

FIG. 2, FIG. 3A, and FIG. 3B show an embodiment of the sealing device of the present invention. FIG. 2 is a sectional view of the sealing device in an attached state, and FIG. 3A and FIG. 3B are sectional views of the sealing device in an unattached state.

The compressor includes, as shown in FIG. 2, a housing H that defines the outline, a rotating shaft S which transmits a rotating drive force from the outside to a compression mechanism (not shown) housed inside the housing H, and so on. The sealing device 10 of the present invention is attached so as to seal the space between (the outer peripheral surface of) the rotating shaft S and (the inner wall surface of a hole Ha) of the housing H and prevents a sealed fluid F accommodated in the internal space from leaking to the outside. The sealed fluid F as a cooling medium is pressurized to a high pressure of about 0.1 to 7 MPa (in the case of oil sealing, less than 0.1 MPa, normally).

The sealing device 10 is basically composed of, as shown in FIG. 2, FIG. 3A, and FIG. 3B, a seal ring 20, a reinforcement ring 30 embedded in the seal ring 20, and a support ring 40 fitted to the inner periphery of the seal ring 20, and has a garter spring 50.

The seal ring 20 is made of a rubber material, and is composed of, as shown in FIG. 2, FIG. 3A, and FIG. 3B, a fitted part 21, an annular part 22, a seal lip part 23, a dust lip part 24, etc. For the seal ring 20, a resin material can be used instead of a rubber material as long as appropriate deformation of the material is obtained in a high-pressure environment.

The fitted part 21 is formed into a cylindrical shape and is fitted into the hole Ha of the housing H.

The annular part 22 extends inwardly in the radial direction from the fitted part 21, and connects the fitted part 21 and the seal lip part 23.

The dust lip part 24 extends to the outside of the housing H in the axial direction S1 from the inner periphery of the annular part 22, and the tip end thereof comes into contact with the rotating shaft S. The dust lip part 24 prevents dust from entering the inside of the housing H.

The seal lip part 23 extends to the inside (sealed fluid F side) of the housing H from a side surface 22f on the sealed fluid F side of the annular part 22, and is formed into a cylindrical shape. The seal lip part 23 has conical surfaces 23c and 23d that define a chevron-shaped section projecting toward the rotating shaft S, and has a seal part 23e that comes into contact with the rotating shaft S in an edge region defined by these conical surfaces 23c and 23d. By contact of the seal part 23e with the periphery of the rotating shaft S, the outer periphery of the rotating shaft S is sealed.

The seal lip part 23 has an annular groove 23h on its outer periphery on the tip end side, and in the groove 23h, the annular garter spring 50 is fitted. The garter spring 50 urges the tip end of the seal lip part 23 toward the rotating shaft S.

The seal lip part 23 has, on the inner periphery of its base region 23a extending from the side surface 22f of the annular part 22, an annular recessed part 23t in which the support ring 40 is fitted. The inner peripheral surface of the annular recessed part 23t is a curved surface along the shape of the supporting surface of the support ring 40.

The seal lip part 23 has an interposed part 23u to be interposed between an annular reinforcement part 32 described later of the reinforcement ring 30 and the support ring 40.

The reinforcement ring 30 has a cylindrical reinforcement part 31 and the annular reinforcement part 32 that are embedded in the fitted part 21 and the annular part 22 of the seal ring 20, respectively, and reinforces the seal ring 20 made of a rubber material. The reinforcement ring 30 is covered by a material that forms the seal ring 20.

The reinforcement ring 30 is made of a metal and is covered by a rubber material that forms the seal ring 20, so that even when a fluid that corrodes the metal is used as the sealed fluid F, the reinforcement ring can be made by a material which is inexpensive and high in strength although it easily gets rusty.

The reinforcement ring 30 is placed in a forming die and integrally molded with the seal ring 20 when molding the seal ring 20.

The support ring 40 is formed to be annular and is fitted in the annular recessed part 23t formed on the inner periphery of the base region 23a of the seal lip part 23 and supports the base region 23a from the inner peripheral side to suppress deformation of the seal lip part 23 due to a pressure of the sealed fluid F.

The support ring 40 is made of a metal. When a fluid that corrodes the metal is used as the sealed fluid F, a metal with resistance to corrosion such as stainless steel or a metal whose surface is coated with a material with resistance to corrosion such as plating, is used.

The support ring 40 has a circular arced sectional shape, and has, on the outer periphery thereof, a supporting surface 40t that supports the annular recessed part 23t. The supporting surface 40t is formed of a curved surface whose outer diameter is gradually reduced toward the tip end side of the seal lip part 23. The inner peripheral surface of the annular recessed part 23t of the seal lip part 23 is also formed into a curved surface along the supporting surface 40t. By forming the supporting surface 40t and the inner peripheral surface of the annular recessed part 23t of the seal lip part 23 into curved surfaces, when the seal lip part 23 is deformed by a pressure, stress concentration and cracks on the seal lip part 23 due to an edge of the support ring 40 can be prevented.

As shown in FIG. 2, the support ring 40 faces the inner surface of the annular reinforcement part 32 of the reinforcement ring 30 in the axial direction S1 via the interposed part 23u as a part of the rubber material forming the seal ring 20. By interposing the interposed part 23u of the rubber material forming the seal ring 20 between the support ring 40 and the annular reinforcement part 32 of the reinforcement ring 30, the interposed part 23u of the rubber material becomes elastically deformable according to the eccentricity of the rotating shaft S, so that the seal lip 23 becomes able to follow the eccentricity of the rotating shaft S.

The support ring 40 is not in contact with the annular reinforcement part 32 of the reinforcement ring 30, but faces the annular reinforcement part 32 in the axial direction S1, so that even if the support ring 40 is subjected to a force in the axial direction S1 from the sealed fluid F, the support ring 40 is supported by the annular reinforcement part 32 of the reinforcement ring 30.

As shown in FIG. 3B, the inner diameter D2 of the annular recessed part 23t of the seal ring 20 in a state in that the support ring 40 is not fitted therein is set to be smaller than the outer diameter D1 of the support ring 40. Namely, to fit the support ring 40 into the annular recessed part 23t, it is necessary to press and expand the seal lip part 23 outward in the radial direction while elastically deforming the seal lip part 23 of the seal ring 20.

When the seal lip part 23 is pressed and expanded outward in the radial direction and the support ring 40 is fitted into the annular recessed part 23t, the base region 23a of the seal lip part 23 elastically deforms outward in the radial direction as shown in FIG. 3A. In this state, the support ring 40 is subjected to a restoring force from the base region 23a of the seal lip part 23, so that the supporting surface 40t and the inner peripheral surface of the annular recessed part 23t are always in close contact with each other.

As shown in FIG. 3B, the seal ring 20 in a state that the support ring 40 is not fitted thereto is set so that the inner diameter of the seal part 23e becomes smaller than the outer diameter of the rotating shaft S. The position of the seal part 23e varies according to variation in the molding accuracy when the support ring 40 is not in a state fitted thereto. When the base region 23a of the seal lip part 23 has a molding error, the position of the seal part 23e greatly varies.

On the other hand, as shown in FIG. 3A, when the support ring 40 is fitted into the annular recessed part 23t, the base region 23a is elastically deformed and the seal part 23e moves to a position corresponding to the outer diameter D1 of the support ring 40. Namely, even when the seal lip part 23 has a molding error, by supporting the inner periphery of the base region 23a by the support ring 40 against a force caused by elastic deformation, the position of the seal part 23e can be substantially fixed. By making the design so that the position of the seal part 23e regulated by the support ring 40 comes into proper contact with the rotating shaft S, the contact area between the seal part 23e and the rotating shaft S becomes stable when the rotating shaft S is inserted into the seal ring 20.

Herein, to make it clearer the advantage of separate molding of the seal ring 20 from the support ring 40 and fitting of the support ring 40 into the seal ring 20 later, an example of a sealing device in which the seal ring 20 and the support ring 40 are integrally molded is shown as a comparative example in FIG. 4A, FIG. 4B, and FIG. 5.

Figure 4A:
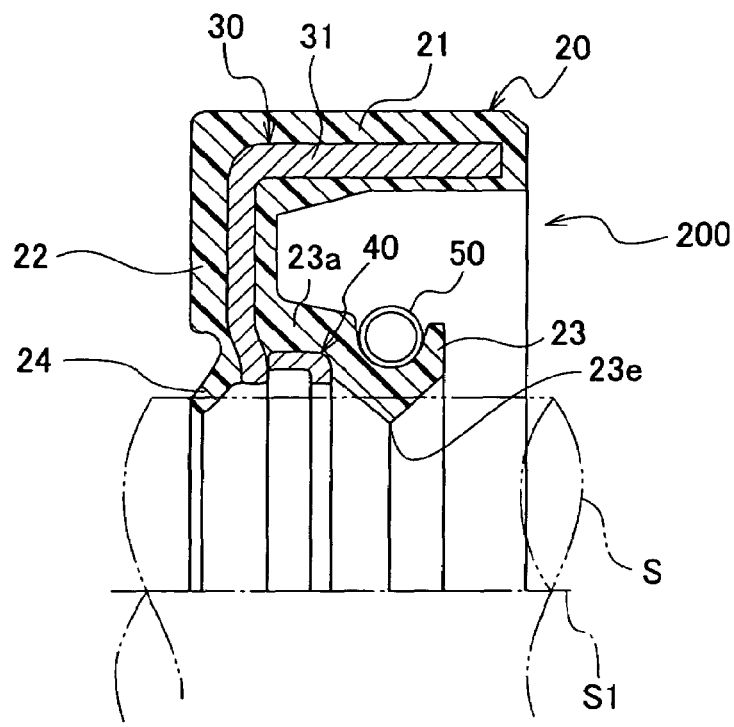
FIG. 4A is a sectional view showing a sealing device including a support ring and a seal ring integrally molded.
Figure 4B:
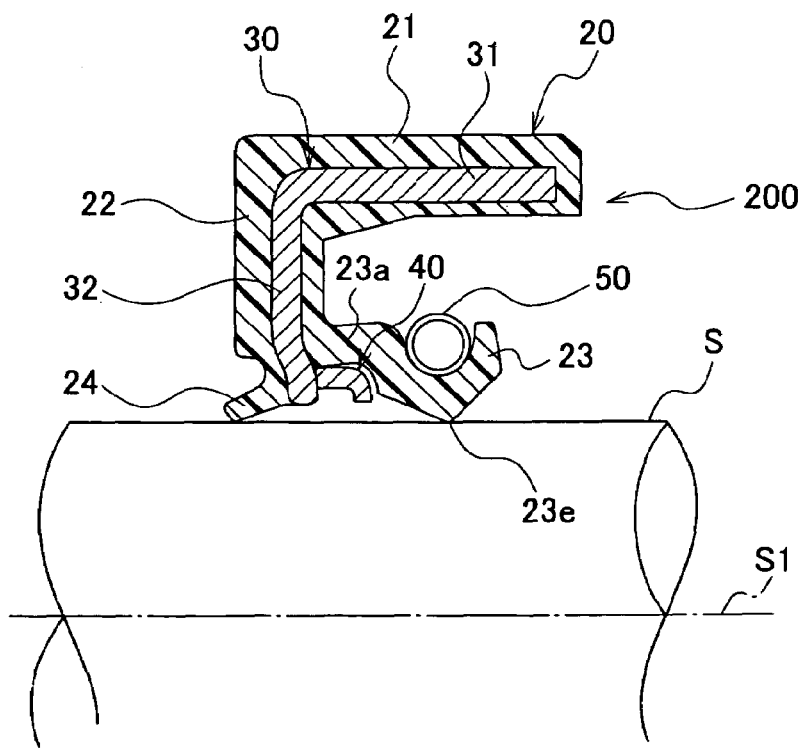
FIG. 4B is a sectional view showing a state in that the sealing device including the support ring and the seal ring integrally molded is attached to a rotating shaft.
Figure 5:
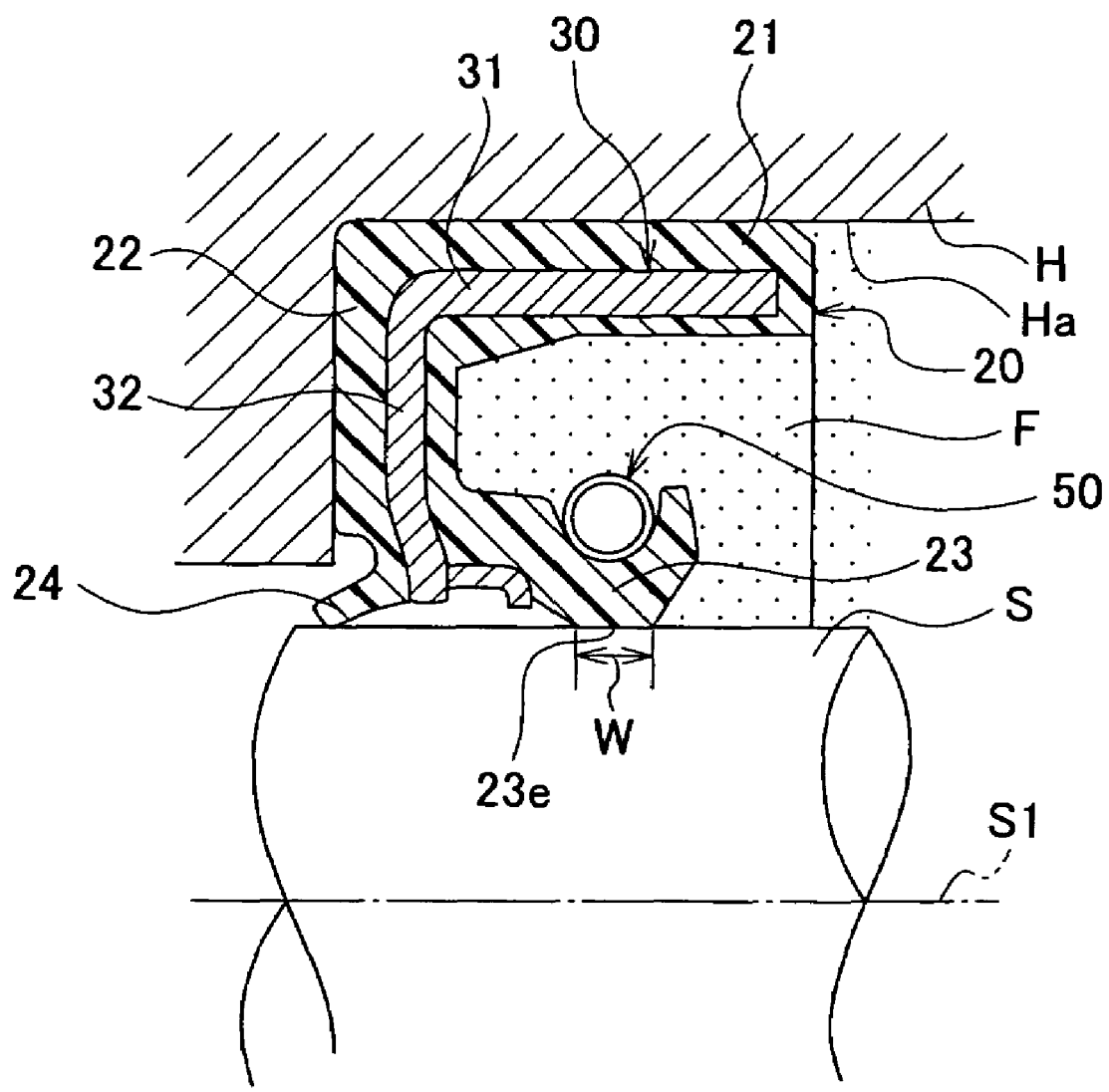
FIG. 5 is a sectional view showing a state in that a sealing device including a support ring and a seal ring integrally molded is attached between a housing and a rotating shaft of a compressor and in that a seal lip part has been deformed by a pressure.

As shown in FIG. 4A, FIG. 4B, and FIG. 5, the support ring 40 of the sealing device 200 is in contact with the annular reinforcement part 32 of the reinforcement ring 30.

When the seal ring 20 and the support ring 40 are integrally molded, the position of the seal part 23e varies according to variation in molding accuracy, and for example, as shown in FIG. 4A, molding may make the position of the seal part 23e greatly intrude into the rotating shaft S side.

As shown in FIG. 4B, when the rotating shaft S is inserted into the sealing device 200 molded in the shape shown in FIG. 4A, the base region 23a of the seal lip part 23 greatly deforms outward in the radial direction, and the seal lip part 23 might peel off from the support ring 40. In this state, the support ring 40 is not supporting the seal lip part 23, so that the effect of suppressing the deformation of the seal lip part 23 by the support ring 40 cannot be obtained.

When the space between the rotating shaft S and the housing H are sealed by using the sealing device 200 in the state shown in FIG. 4B, if the pressure of the sealed fluid F becomes high, as shown in FIG. 5, the seal lip part 23 greatly deforms toward the rotating shaft S, and the contact width W in the axial direction S1 between the seal part 23e and the rotating shaft S remarkably increases. Namely, in the sealing device 200, the support ring 40 is not sufficiently supporting the seal lip part 23, so that the effect of suppressing the deformation of the seal lip part 23 by the support ring 40 is not sufficiently obtained.

On the other hand, in the embodiment of the present invention shown in FIG. 2 described above, in a state in that the support ring 40 is fitted in the annular recessed part 23t of the seal ring 20, the support ring 40 reliably supports the inner peripheral side of the seal lip part 23. Therefore, when the seal lip part 23 is pressurized from the sealed fluid F, the effect of suppressing the deformation of the seal lip part 23 by the support ring 40 can be reliably obtained.

Figure 6:
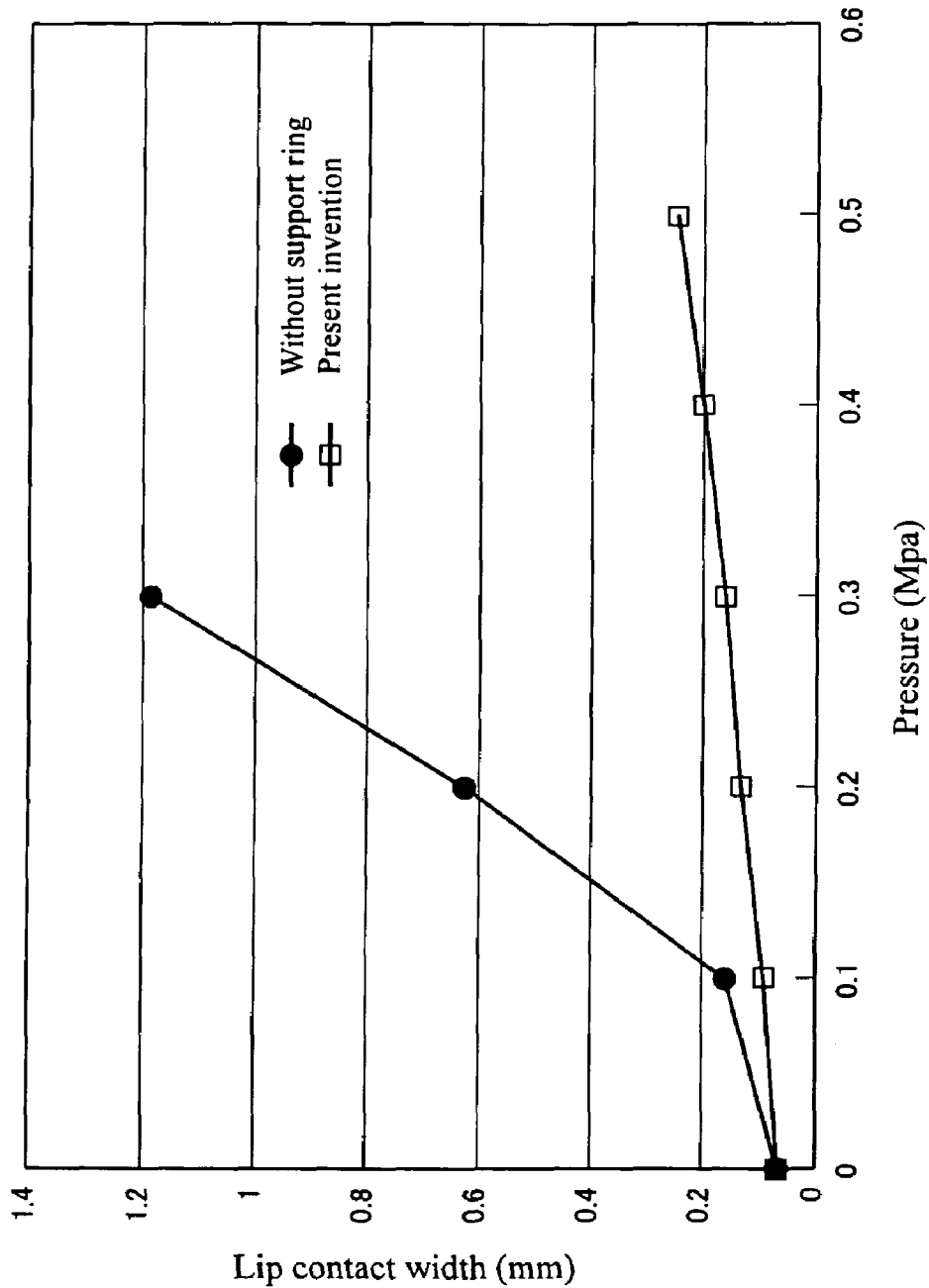
FIG. 6 is a graph showing a relationship between a contact width of the seal lip part with the rotating shaft and a pressure of a sealed fluid.

Herein, in FIG. 6, an example of the relationship between the pressure rise of the sealed fluid F and the contact width between the seal lip part 23 and the rotating shaft S is shown. For comparison, a sealing device which has no support ring 40 is also shown.

As shown in FIG. 6, when the seal lip part 23 is supported by the support ring 40, the contact width gradually increases in proportion to the pressure rise. However, when it is not supported by the support ring 40, the contact width is not in proportion to the pressure rise, but suddenly increases.

As described above, according to this embodiment, by fitting the support ring 40 into the inner periphery of the seal ring 20 independently of the reinforcement ring 30 to support the inner periphery of the base region 23a of the seal lip part 23 against the force of elastic deformation, the position of the seal part 23e of the seal ring 20 can be substantially fixed, and when the rotating shaft S is inserted into the seal ring 20, the contact area between the seal part 23e and the rotating shaft S can be made appropriate.

When a high pressure is applied to the seal lip part 23, the support ring 40 reliably supports the seal lip part 23, so that excessive deformation of the seal lip part 23 can be prevented, and an increase in contact area between the seal part 23e and the rotating shaft S can be suppressed within an appropriate range.

Furthermore, according to this embodiment, the interposed part 23u of the rubber material as a forming material of the seal ring 20 is interposed between the annular reinforcement part 32 of the reinforcement ring 30 and the support ring 40, so that the seal lip part 23 can be made to follow the eccentricity of the rotating shaft S, and the seal lip part 23 can be prevented from being worn by the eccentricity of the rotating shaft S.

According to this embodiment, the support ring 40 is provided separately from the reinforcement ring 30, so that the location, dimensions, strength, and material, etc., of the support ring 40 can be optimally set according to the environment of use of the sealing device without being limited by the reinforcement ring 30.

Figure 7:
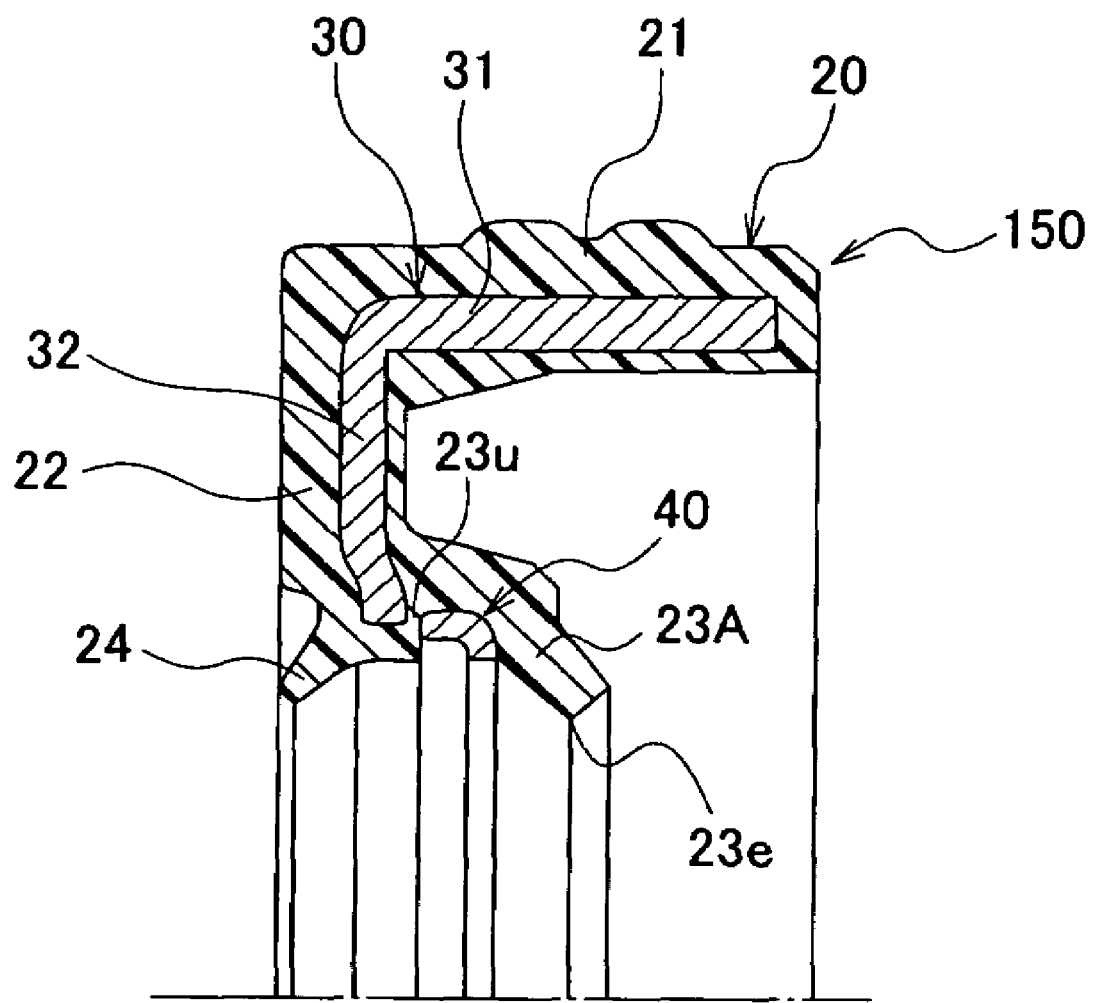
FIG. 7 is a sectional view showing another embodiment of the sealing device according to the present invention.

In the embodiment described above, a sealing device in which a garter spring 50 is provided on the outer periphery of the seal lip part 23 is described, however, the present invention is not limited to this, and the present invention is also applicable to a sealing device 150 which has no garter spring 50 on the seal lip part 23A as shown in FIG. 7.

In the embodiment described above, a sealing device having a dust lip part 24 is described, however, the present invention is also applicable to a sealing device that has no dust lip part 24.

In the embodiment described above, a case where the base region 23a of the seal lip part 23 is supported by the support ring 40 is described, however, the present invention is not limited to this, and it is also possible that the support ring 40 is extended toward the tip end side of the seal lip part according to a pressure of a cooling medium to be sealed, or the support ring 40 is entirely moved to the tip end side of the seal lip part 23.

As described above, according to the sealing device of the present invention, by reliable functioning of the support ring, wearing and heating due to sliding friction are reduced and durability is improved while desired sealing performance is maintained, so that the sealing device of the present invention is suitably fitted to a region to be exposed to a high-pressure environment, and is useful in machines and electrical equipment which need sealing of the outer periphery of a reciprocating shaft as well as a rotating shaft.

What is claimed is:

1. A sealing device for sealing a space between a housing that houses a sealed fluid and a shaft, comprising:
   a seal ring formed from an elastic material and having a fitted part, an annular part having a tip end and extending inwardly in a radial direction from the fitted part, a cylindrical seal lip part formed from an elastic material, having an inner periphery, and extending from the annular part toward a sealed fluid side of the housing and being subjected to a pressure of the sealed fluid, an annular recessed part disposed toward the tip end of the annular part on the inner periphery of the seal lip part, and a seal part extending inwardly and opposite to the sealed fluid;
   a reinforcement ring having an annular reinforcement part embedded in the annular part and extending inwardly in the radial direction; and
   a support ring fitted in the annular recessed part of the seal lip part, supporting the seal lip part, wherein
   the annular recessed part having an outermost surface,
   the annular reinforcement part of the reinforcement ring supports the support ring axially via an interposed part of the elastic material forming the seal lip part,
   an innermost part of the reinforcement part being axially off-set toward the sealed fluid,
   the innermost part extending radially inward beyond the outermost surface of the annular recessed part,
   the seal ring is molded separately from the support ring,
   the support ring is configured so as to be fitted in the annular recessed part of the seal lip part by pressing and expanding an inner diameter of the seal ring,
   the support ring having an axial part and a radial part extending inwardly thereof, and
   a supporting surface of the support ring supporting an inner peripheral surface of the seal lip part is formed of a curved surface having an outer diameter that is gradually reduced toward the tip end side of the seal lip part, and the inner peripheral surface of the seal lip part is curved along the supporting surface.

* * * * *